United States Patent [19]

Hurst

[11] 4,413,288

[45] Nov. 1, 1983

[54] INDICATOR CONTROL SIGNAL GENERATOR FOR VIDEO TAPE RECORDER

[75] Inventor: Robert N. Hurst, Cherry Hill, N.J.
[73] Assignee: RCA Corporation, New York, N.Y.
[21] Appl. No.: 328,438
[22] Filed: Dec. 7, 1981
[51] Int. Cl.$^3$ ............................................. G11B 27/36
[52] U.S. Cl. ........................................ 360/31; 360/8; 360/27
[58] Field of Search ...................... 360/8, 9, 27, 31, 38

[56] References Cited

U.S. PATENT DOCUMENTS 3,225,135 12/1965 Osawa et al. ..................... 178/6.6
3,369,082 2/1968 Hibbard ........................... 179/100.2
3,404,223 10/1968 La Violette ....................... 178/6.6

OTHER PUBLICATIONS

U.S. patent application Ser. No. 216,170, filed 12-15-80 in the name of R. A. Dischert entitled, "Recording of Timing Signals Synchronous with a Rotary Recording Member".
U.S. patent application Ser. No. 201,053, filed 10-27-80 in the name of H. R. Warren entitled, "Timed-Base Error Reduction in Portable VTR".

Primary Examiner—Vincent P. Canney
Attorney, Agent, or Firm—Eugene M. Whitacre; William H. Meise

[57] ABSTRACT

A signal indicative of tape tension or of recording of signal on tape is generated in a helical-scan recorder. A test signal having a particular frequency characteristic is recorded by rotating heads at a high head-to-tape speed. A fixed playback head downstream from the headwheel picks up the test signal converted in frequency by the ratio of the reading speed to the writing speed, and applies it to a detector. The detector is a synchronous detector which receives at a second input terminal a frequency-divided sample of the test signal which controls demodulation by the synchronous detector. The frequencies of the input signals to the phase detector differ by a small amount, so that an output signal can always be generated no matter what the phase of the input signal. The rate of pulsation of the output signal is indicative of tape tension.

8 Claims, 6 Drawing Figures

INDICATOR CONTROL SIGNAL GENERATOR FOR VIDEO TAPE RECORDER

This invention relates to a record-presence or tape-tension indicator for a helical-scan video tape recorder.

In electronic newsgathering (ENG) applications, the operator of a portable television camera records the information on a portable tape recorder. Since news events generally happen only once, it is important to the news service using the camera to be sure that the event is properly recorded. It is desirable to verify that the tape recorder used to record the video produced by the camera is in fact recording the video. For this purpose, it is desirable to warn the operator in the event that recording does not take place.

Generally speaking, modern video tape recorders operate by mechanically scanning one or more recording heads bearing magnetic gaps across the tape to achieve high frequency response without extreme tape speed. One of the most common forms of failure to record involves a loss of coupling between the head and the tape due to foreign matter or dirt. Such a decoupling will cause failure to record, notwithstanding that signals are applied to the recording head. Consequently, schemes which verify application of signal to the recording head will not necessarily be indicative of failure to record. What is needed is a playback head which is responsive to the recorded video signal.

Playback of the recorded signal can be accomplished by a playback head associated with the scanning recording head. The playback head can be mounted on the headwheel for rotation therewith and can scan across the tape. With such an arrangement, the recorded video may be detected and processed to provide an indication of recorded signal level which may be further processed by comparison with a reference level representing the minimum acceptable recorded signal level to provide the operator with an indication when the recorded signal level is above the minimum.

Arranging the playback head on the rotating headwheel in a helical-scan or quadruplex system increases the weight of the headwheel and requires additional slip ring contacts or rotary transformers, and is for that reason undesirable. The increase in weight of the headwheel due to the additional transformers and heads is particularly undesirable in the case of an ENG camera-recorder because the additional weight increases the inertia of the headwheel and makes the headwheel more subject to variations attributable to motion of the recorder, as described in more detail in U.S. patent application Ser. No. 201,053 filed 10-27-80 in the name of H. R. Warren and entitled "TIME BASE ERROR REDUCTION IN PORTABLE VTR".

In order to avoid the problems associated with a rotating playback head, a fixed head may be arranged downstream from the headwheel in the direction of tape flow so that the fixed head is traversed by portions recorded by the headwheel transducer, as described in U.S. Pat. No. 3,404,223, issued Oct. 1, 1968 to Violette. A fixed head may be connected through an amplifier to a detector which produces a signal indicative of the peak or average recorded level, which signal may be applied to a meter or lamp to provide an indication of the degree of recording. In practice, this general technique has proved to be unreliable, because the output of a magnetic transducing head is proportional to the rate-of-change of flux across its gap, and therefore, the magnitude of the output signal is proportional to the relative head-to-tape speed, which is very low. The small-amplitude signal cannot be reliably detected for use as an indication of recording level. Furthermore, the fixed head may be subject to crosstalk from other fixed heads such as a time code recording head and the crosstalk signal may exceed the magnitude of the desired detected signal. Thus, crosstalk may cause an indication of recording when there is in fact no recording. In the absence of crosstalk, the signal level may drop so low as to indicate an absence of recording when in fact recording is being accomplished.

SUMMARY OF THE INVENTION

A helical-scan video tape recorder includes a headwheel and a recording head mounted on the headwheel. Signals are coupled to the recording head to allow transducing. A tape transport is adapted for driving a magnetic tape along a tape path which passes around the periphery of the headwheel at a first rate for presenting unrecorded tape portions for recording. A headwheel drive is coupled to the headwheel for driving the headwheel at a second rate for translating the transducer for allowing high video frequencies to be transduced. A playback head is arranged adjacent the tape path for transducing signals from the tape during recording by the recording head. A frequency-sensitive detector is coupled to the playback head for responding to recorded signals. According to the invention, a signal generator is coupled to the recording head for recording a signal having a predetermined frequency characteristic, and a frequency-shifter is coupled to the signal generator and to the detector for changing frequency of the signal generator and for applying the changed-frequency signal to the detector.

DESCRIPTION OF THE INVENTION

Figure 1:
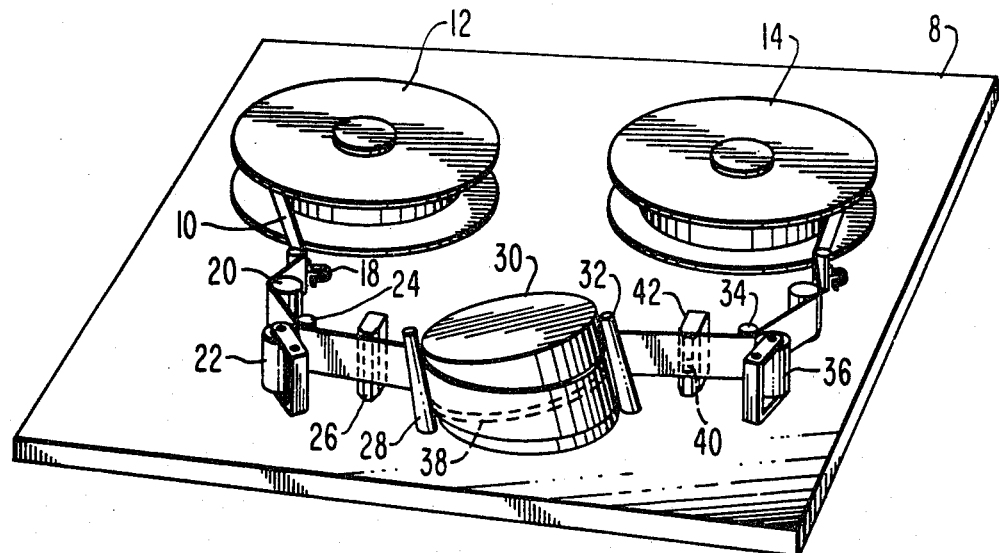
FIG. 1 illustrates a helical-scan tape recorder showing the location of the fixed head.

FIG. 1 illustrates generally the support plate and the main transport portions of a helical-scan tape recorder. Base plate 8 bears a tape supply reel 12 and a take-up reel 14. A tape 10 leaves supply reel 12 and passes in succession over a tensioning spring 18 and a roller 20. The tape leaving roller 20 passes between a pinch roller 22 and a capstan 24 and thence to a guide post 28 which leads the tape onto a headwheel 30. Between capstan 24 and guide post 28, tape 16 passes across an erase head 26. Tape 10 leaves headwheel 30 guided by a second post 32 and passes between a drive capstan 34 and a pinch roller 36 before being guided onto take-up reel 14. In normal operation, rotation of headwheel 30 causes one or more heads (not illustrated) associated with headwheel 30 to scan a path illustrated as 38 across tape 10. In accordance with the invention, a pickup head illustrated as 40 in FIG. 1 may be mounted in a stationary position as in a post 42 on the take-up side of headwheel 30. The gap (not shown in FIG. 1) of head 40 is substantially perpendicular to the direction of tape motion and will provide response which can be sensed and processed in order to provide an indicative signal which may be indicative of recording or of tape tension as described hereinafter.

Figure 2:
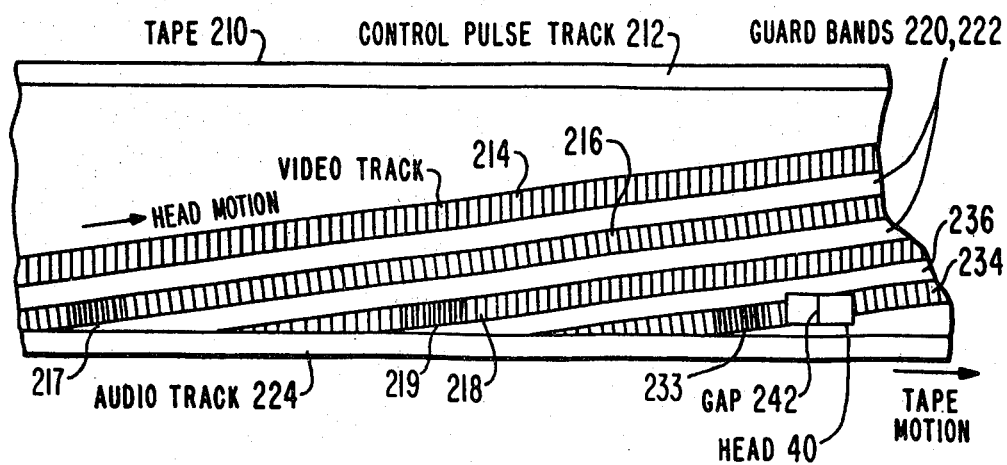
FIG. 2 illustrates a portion of a tape illustrating recorded video tracks and the relative location of a stationary playback head.

FIG. 2 illustrates a magnetic tape 210 at the top of which is recorded a control pulse track 212 and at the bottom of which is recorded an audio track 224. The tape moves to the right as illustrated in FIG. 2 with respect to head 40 in which a gap 242 is formed. Head 40 is connected as a playback head and is fixed to the body of the recorder as described in conjunction with FIG. 1. A record head (not shown in FIG. 2) has just finished laying down video track 214. The direction of head motion during the setting down of the tracks is illustrated by the arrow. The track layed down previous to track 214 is track 216, and previous to that 218, and so on. The track presently overlying head 40 is track 234. Between tracks 214 and 216 is a guardband 220, between tracks 216 and 218 is a guardband 222, and between track 218 and track 234 is a guardband 236. As illustrated, audio track 216 includes video and sync signals illustrated by parallel lines and also includes a portion 217 illustrated as having a denser crosshatching. Portion 217 represents a recorded test signal which occurs at a time during the vertical blanking interval of the television signal. As is known, the rotation of headwheel 30 is controlled in synchronism with the video to be recorded so that the vertical blanking interval of the television signals to be recorded occur at one end of each track. As illustrated in FIG. 2, the vertical blanking interval occurs near the bottom of each track. Test signal 217 occurs within track 216 within the portion otherwise used to record the vertical blanking interval portions of the television signal. Similarly, portion 219 of track 218 represents a portion recorded with a test signal, as does portion 233 of track 234.

At the instant shown, gap 242 of head 40 is overlying track 234 and is transducing signals representative of vertical blanking information. As tape 210 is drawn to the right relative to head 40, head 40 will overlie the region 233 in which the test signal is recorded, and will transduce the test signal. At a later time, gap 242 will overlie portion 219 of track 218 and will transduce the test signal therefrom, and so forth.

Figure 3:
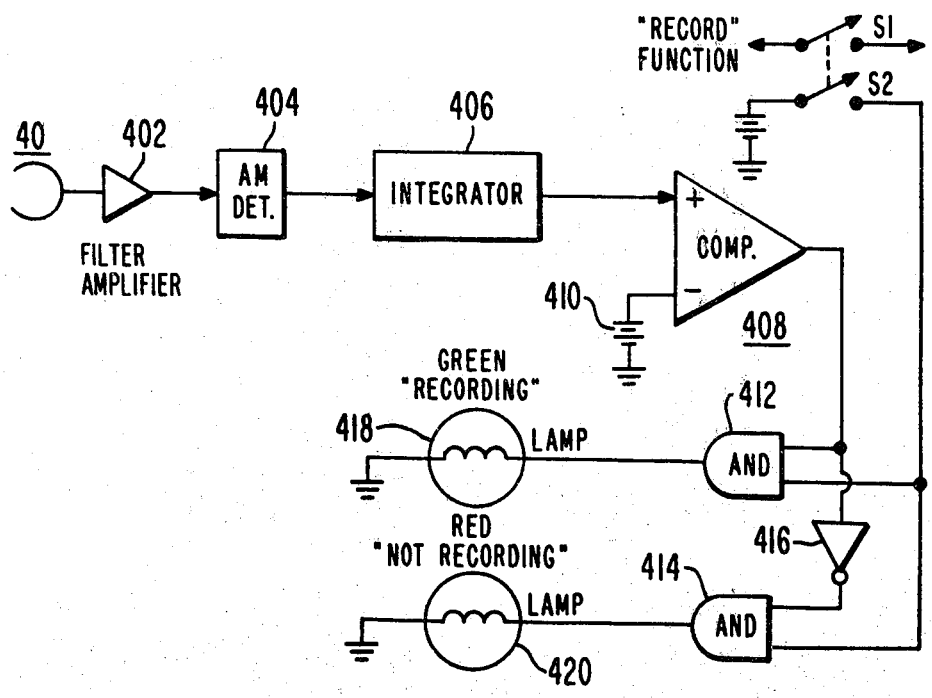
FIG. 3 illustrates in block-diagram form circuits for generating a recording-indication signal.

FIG. 3 illustrates in block diagram form a circuit for providing a recording indication from the test signals recorded on the tape. In FIG. 3, head 40 responds to both the test signals recorded on the tape and to those signals other than the test signal which are recorded and across which it passes. A filter-amplifier combination 402 amplifies the signals at the frequency of the transduced test signal and rejects frequencies other than the test signal frequency. The amplified and filtered signals are applied to an amplitude detector 404 and the detected signal is integrated by an integrator illustrated as a block 406. The integrated signal is applied to the non-inverting input of a comparator 408 which compares the amplitude of the integrated signal with a reference voltage source illustrated as a battery 410. The output of the comparator is applied to an input of an AND gate 412 and, by an inverter 416, to an input of an AND gate 414. The other input of AND gates 412 and 414 are coupled together and by way of a switch S2, to a voltage source. The output of AND gate 412 is applied to a green "recording" lamp 418 and the output of gate 414 is applied to a red "not recording" lamp 420. Switch S2 is ganged with a switch S1 which controls the recording function of the tape recorder. Thus, when switch S1 enables the recording function, switch S2 applies the voltage to each of the AND gates to enable them. If the signal integrated by integrator 406 exceeds the level of reference source 410, the output signal of compartor 408 is high which enables AND gate 412 to light the green "recording" lamp. If the integrated signal level is low, the output signal of comparator 408 is low which results in disabling AND gate 412 and enabling AND gate 414 to light the red "not recording" lamp 420.

Figure 4:
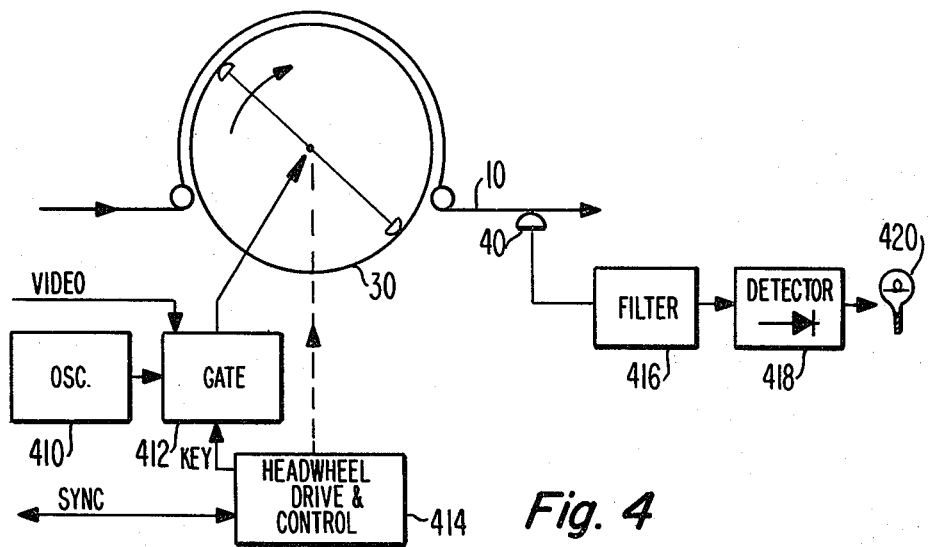
FIG. 4 depicts headwheel, tape and circuits in block-diagram form as an aid to understanding the invention.

FIG. 4 illustrates an arrangement for generating the test signal and its relationship to the detector. In FIG. 4, an oscillator 410 generates a signal at a particular frequency such as 300 kilohertz (KHz). The 300 KHz test signal is applied to a multiplex gate 412. Also applied to gate 412 are television video signals from a source (not shown). A headwheel drive and control circuit 414 receives synchronizing signals related to the generation of the video signals and drives headwheel 30 and its associated recording heads in synchronism therewith in known manner. Alternatively, headwheel drive and control 414 may generate synchronizing signals, by which the rate of generation of the video signals is control, as described in U.S. patent application Ser. No. 216,170, filed 12-15-80 in the name of Dischert and entitled "RECORDING OF TIMING SIGNALS SYNCHRONOUS WITH A ROTARY RECORDER MEMBER".

A keying signal is generated by the headwheel drive and control circuit which is applied to multiplex gate 412 at a time during the vertical blanking interval of the television video signal. During the keying interval, which may have a particular duration such as five horizontal line intervals (5H), gate 412 couples the test signal from oscillator 410 to the transducers of headwheel 30. Thus, a burst of 300 KHz tone is recorded by the rotating heads during a few lines of the vertical interval. The burst tone as recorded is transported together with tape 10 to a position downstream in the direction of tape flow from headwheel 30 and past fixed head 40. Fixed head 40 senses the test signal. However, because of the difference between the head-to-tape speed of the transducers of rotating headwheel 30 and head-to-tape speed of fixed head 40, the 300 KHz burst is detected as a much lower frequency. In a particular embodiment of the invention, the burst is received by head 40 as an 11 KHz burst. The 11 KHz burst received by head 40 is filtered and amplified as necessary in a filter 416 and applied to a detector 418 for producing a control signal which illuminates a lamp 420 in a manner similar to that described in conjunction with FIG. 3.

As mentioned, the amplitude of the signal picked up from tape 10 by fixed head 40 is extremely small because of the relatively low head-to-head tape speed which reduces the rate of change of flux across the head which as is known reduces the signal amplitude by comparison with the signal amplitude received by a playback head rotating with headwheel 30. This signal may be so small that detector 418 cannot respond, thereby falsely giving an indication of no recording when in fact recording is taking place. Also, crosstalk from other heads in the vicinity of head 40 may couple enough signal into head 40 to cause detector 418 to respond and thereby falsely provide an indication of recording, even if no recording is taking place.

Figure 5:
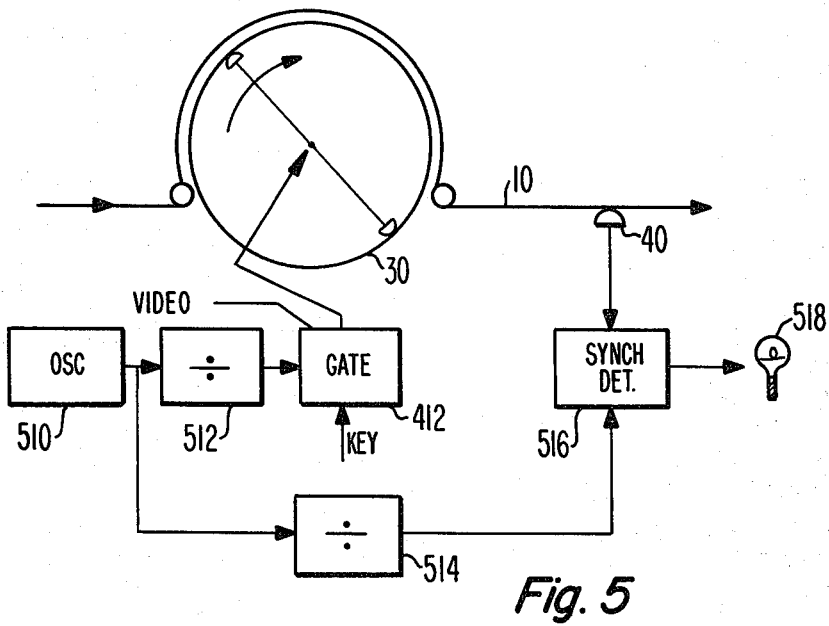
FIG. 5 depicts headwheel, tape and circuits in accordance with the invention.

FIG. 5 illustrates an arrangement according to the invention. In FIG. 5, headwheel drive and control 414 is not shown. In FIG. 5, a test oscillator 510 produces a 900 KHz signal which is applied to a divide-by-three frequency divider 512 and to a divide-by-eighty-three frequency divider 514. The output of frequency divider 512 is the 900 KHz signal produced by oscillator 510 divided to 300 KHz, corresponding to the test signal described in conjunction with FIG. 4. The test signal is applied to an input of multiplex gate 412 which is keyed at an appropriate time in order to apply the 300 KHz test signal to the tape during the vertical blanking interval. The video is recorded as before during those times in which the test signal is not being recorded. The test signal as recorded proceeds downstream to head 40 where it is transduced to provide a test signal at approximately 11 KHz which is applied to a synchronous detector 516.

The 900 KHz signal produced by oscillator 510 is frequency-divided by a factor of 83 to produce a signal at approximately 11 KHz. This signal is applied to synchronous detector 516 to control the detection of the signal transduced from the tape. As will be shown, the nominal 11 KHz signals differ slightly from each other by a factor which creates a pulsating output signal. The pulsating output signal can be integrated as described in conjunction with FIG. 3 in order to produce a control signal indicative of recording. Also, the frequency of the pulsations may be used as an indication of tape tension. The synchronous detector is substantially more sensitive to signals than is an ordinary amplitude detector, and provides increased sensitivity which prevents false indications.

If the headwheel diameter or, more properly, the diameter of the circle passing through the tips of the rotating heads is 62 millimeters (mm) and the headwheel has an angular velocity of 30 revolutions per second, the circumferential head speed may be calculated as 5843.3623 mm/s. In an actual embodiment, the corresponding linear tape speed by which the tape is transported through the tape path past the headwheel is 204.537 mm/s, and the corresponding track angle is 4.7452°. The writing speed is the difference between the headspeed and the product of the tape speed and the cosine of the track angle. Thus, $$V_s - V_r = V_w$$

For the aforementioned parameters, the writing speed $V_w$ is 5639.5263 mm/s. The reading speed $V_r$ is the product of the tape speed times the cosine of the track angle.

$$V_t \cos A = V_r$$

The corresponding reading speed $V_r$ is 203.83593 mm/s. The ratio of the reading speed to the writing speed is $$5639.5263/203.83593 = 27.666988$$

This ratio is extremely close to 27.6666..., which is 83/3. Therefore, the exact frequency of the replayed 300 KHz tone is $$300/27.666988 = 10.843247 \text{ KHz}$$

This frequency differs from the frequency produced by frequency divider 514 by 0.1261 Hz. This slight frequency difference is very advantageous, because the relative phase of the signal from the tape and the signal from divider 514 is not known a priori. If the frequencies were the same, the situation could exist in which the signals were in quadrature, with the result that the synchronous detector would give zero output even though head 40 was transducing a signal. With the small frequency difference, all possible phases or 360° are scanned through every 7.9 seconds. Thus, the signal will pulsate at a 7.9 second rate. As mentioned, the signal can be integrated to produce the desired record indication.

Figure 6:
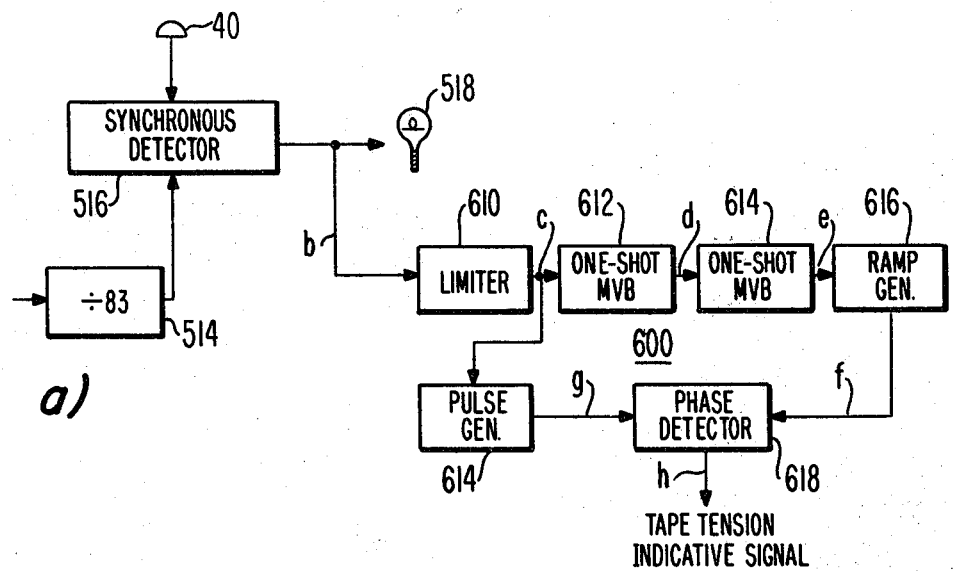
FIG. 6 illustrates a frequency-responsive arrangement for providing a voltage related to frequency together with signal waveforms illustrating its operation.
Figure 6:
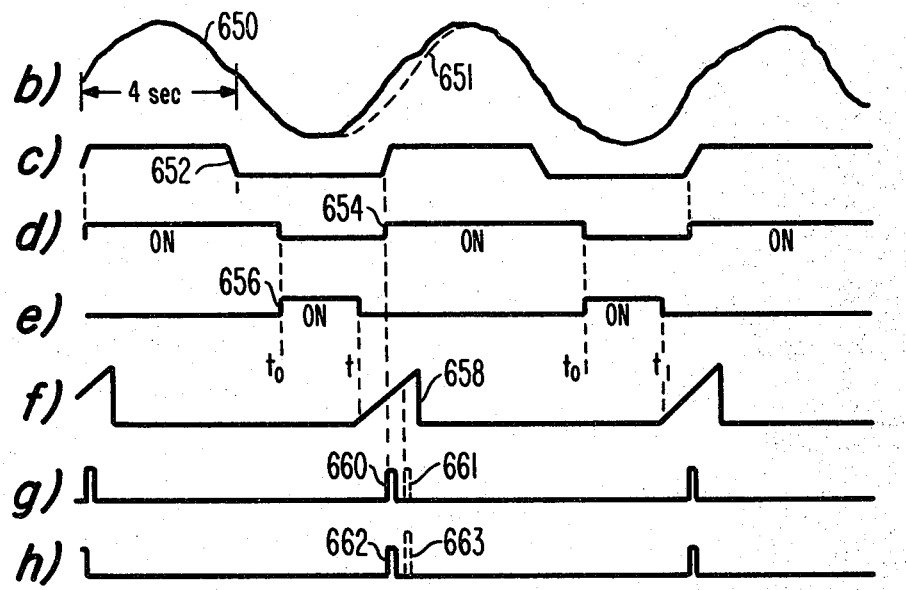

FIG. 6 illustrates an arrangement responsive to the rate of pulsation of the output signal of synchronous detector 516 in the arrangement of FIG. 5. A signal is produced which is dependent upon the rate of pulsation, which in turn is dependent upon the tension of the tape. The signal indicative of tape tension may be used in a feedback loop with conventional tape tension controllers (not shown) for maintaining a particular value of tape tension, or may be used for an indicator or for other purposes.

The tape tension around the headwheel stretches the tape. Since the velocity of the unstretched tape is constant at a rate controlled by the drive capstan, the rate of motion of the stretched portion of the tape is greater than the rate of motion of the unstretched tape. Thus, the tape rate of peripheral motion around the headwheel exceeds the rate of motion across the drive capstan. Increased tension creates a greater rate of motion around the headwheel without a commensurate increase in rate through the capstan. The headwheel peripheral velocity is constant, and is not affected by tape tension. The ratio of the writing speed to the reading speed determines the exact frequency of the test burst as picked up by head 40. The ratio is a function of tension, and therefore the sensed frequency of the test burst is a function of tape tension. Generally speaking, the ratio K of reading speed to writing speed is given by the equation $$K = VW/VR = (V_s - V_t \cos A)/V_t \cos A = (V_s/V_t \cos A) - 1$$

where $V_s$ is the linear speed of the head, $V_t$ is the linear speed of the tape and A is the track angle. When tension varies, $V_t$ varies, creating a new value of K, as required for the change in frequency.

In FIG. 6, the output signal 650 from synchronous detector 516 is illustrated in FIG. 6b as having pulsations at approximately 10-second intervals, corresponding to a 1/10 Hz rate. These signals are applied to a limiter 610 of frequency sensor 600 over a conductor b. Limiter 610 limits the amplitude of the signal to produce on a conductor c an approximate square wave 652 which is applied to a 1-shot multivibrator 612 and to a pulse generator 614. Multivibrator 612 triggers to an ON state at positive zero-crossings of square-wave 652, and returns to a stable OFF state at a later time such as time $t_0$, generating on a conductor d a rectangular-wave signal 654 as illustrated in FIG. 6d. The negative-going transitions of pulses 654 trigger a further astable or one-shot multivibrator 615 which initiates a further timing interval by generating on a conductor e a pulse signal 656 as illustrated in FIG. 6e. The timing interval of multivibrator 615 determines as it makes a transition from the astable to the stable state at a time $t_1$. At time $t_1$, the negative-going transitions of pulses 656 trigger a ramp generator 616 which produces on a conductor f a ramp signal illustrated as 658 in FIG. 6f. Ramp signal 658 ramps for a duration including the entire variation expected in the duration of signal 650. Limited pulses 652 on conductor c trigger pulse generator 614 to produce on conductor g pulse signals illustrated as 660 in FIG. 6g. Ramp 658 and pulses 660 are applied to individual inputs of a phase detector 618 which samples the ramps at the times of the pulses to produce pulses 662 having an amplitude which vary depending upon the relative phase of the input signals. If the duration of a sinusoid 650 increases, as illustrated by dotted line 651, pulses 660 occur at a later time such as 661 with the result that ramp 658 is sampled at a later time and the amplitude of the pulses 662 illustrated in FIG. 6h increases as illustrated by pulses 663. An integrator may be coupled to conductor h to integrate the pulse amplitude to produce a control signal, or a pulse may be used directly as an indication of tape tension.

Other embodiments of the invention will be apparent to those skilled in the art. In particular, bandpass filters can be used in conjunction with synchronous detector 516 to limit the range of frequencies applied to the detector from head 40 to the frequencies of interest, or the head may be formed in known manner as a low-pass filter if the test signal is a lower frequency than other recorded signals. Also, a low-pass filter and/or an integrator may be coupled to the output of synchronous detector 516 to attenuate undesired signal frequencies.

What is claimed is:

1. A helical scan television video tape recorder comprising:
   a headwheel;
   a recording transducer mounted on said headwheel;
   coupling means coupled to a source of television signals and to said recording transducer for enabling transduction;
   tape transport means adapted for driving a magnetic tape along a tape path past said headwheel at a first rate for presenting unrecorded tape portions for recording;
   headwheel drive means coupled to said headwheel for driving said headwheel at a second rate for translating said transducer at a rate allowing high video frequencies to be transduced;
   a playback transducer arranged adjacent said tape path for transducing signals from the tape during recording by said recording transducer; and
   frequency-sensitive detection means coupled to said playback transducer for responding to recorded signals for producing a record-indicating signal;
   wherein the improvement comprises;
   signal generating means coupled to said recording transducer for recordation of a signal having a preselected frequency characteristic; and
   frequency-changing means coupled to said signal generating means and to said detection means for changing the frequency of the signal of said signal generating means and for applying the frequency-changed signal to said detection means.

2. A recorder according to claim 1 wherein;
   said signal generating means produces a test signal at a first frequency;
   said frequency-changing means receives said test signal at said first frequency and converts said test signal to a second frequency.

3. A recorder according to claim 2 wherein said first and second frequencies are approximately related by the ratio of said first and second rates.

4. A recorder according to claim 1, 2 or 3 wherein said frequency-sensitive detector comprises a bandpass filter.

5. A helical-scan tape recorder including verification means, the recorder comprising:
   a source of signal having a particular frequency characteristic;
   a headwheel adapted for rotation at a first rate;
   tape transport means adapted for transporting a tape web past said headwheel at a second rate through a tape path extending about said headwheel;
   a recording head mounted on said headwheel for rotation therewith and also coupled with said source of signal for transducing said signal, said recording head being subject to clogging whereby recording cannot occur;
   a playback head mounted in a fixed position adjacent said tape path for transducing second signals related to said signal having a particular frequency characteristic during recording;
   a frequency reducer coupled to said source of signals for producing a third signal related to said signal having a particular frequency characteristic, the reduction being in an amount related to the said first and second rates; and
   a synchronous detector coupled to said playback head and to said frequency reducer for detecting said second signals by use of said third signals to produce an indicative signal.

6. A recorder according to claim 5 wherein said indicative signal indicates recording.

7. A recorder according to claim 5 wherein said indicative signal represents tape tension.

8. A recorder according to claim 5 wherein said reduction is proportional to the ratio of the peripheral velocity of said headwheel and the linear velocity of the tape.

* * * * *